US012762638B2

(12) United States Patent
Du et al.

(10) Patent No.: US 12,762,638 B2
(45) Date of Patent: Oct. 13, 2026

(54) IMAGE RECEIVING DEVICE AND IMAGE RECEIVING METHOD

(71) Applicant: SigmaStar Technology Ltd., Xiamen (CN)

(72) Inventors: Weisheng Du, Xiamen (CN); Yanxiong Wu, Xiamen (CN)

(73) Assignee: SIGMASTAR TECHNOLOGY LTD., Xiamen (CN)

( * ) Notice: Subject to any disclaimer, the term of this patent is extended or adjusted under 35 U.S.C. 154(b) by 40 days.

(21) Appl. No.: 19/189,442

(22) Filed: Apr. 25, 2025

(65) Prior Publication Data

US 2025/0363583 A1 Nov. 27, 2025

(30) Foreign Application Priority Data

May 23, 2024 (CN) ......................... 202410649370.1

(51) Int. Cl.
*G06T 1/00* (2006.01)

(52) U.S. Cl.
CPC .................................. *G06T 1/0007* (2013.01)

(58) Field of Classification Search
CPC ... H04N 1/2112; H04N 1/2137; H04N 1/2141
See application file for complete search history.

(56) References Cited

U.S. PATENT DOCUMENTS 8,169,498 B2 * 5/2012 Yamashita ........... H04N 25/671 348/222.1
2013/0222617 A1 * 8/2013 Silverbrook ............. B41J 11/70 348/207.2
2026/0140696 A1 * 5/2026 Sheu ....................... G06F 5/065

* cited by examiner

*Primary Examiner* — Marly S Camargo
(74) *Attorney, Agent, or Firm* — Edell, Shapiro & Finnan, LLC

(57) ABSTRACT

An image receiving device includes a first-in-first-out (FIFO) memory, a processor circuit and a FIFO multiplexer circuit. The FIFO memory includes a plurality of FIFO buffers. The processor circuit sets a plurality of first pipeline parameters according to device information of a plurality of image sensors and data capacities of the FIFO buffers. The FIFO multiplexer circuit configures correspondence between the image sensors and the FIFO buffers according to the first pipeline parameters, such that each of the image sensors transmits image data to a corresponding one of the FIFO buffers.

13 Claims, 5 Drawing Sheets

IMAGE RECEIVING DEVICE AND IMAGE RECEIVING METHOD

This application claims the benefit of China application Serial No. CN202410649370.1, filed on May 23, 2024, the subject matter of which is incorporated herein by reference.

BACKGROUND OF THE INVENTION

Field of the Invention

The present application relates to an image receiving device, and more particularly to an image processing device and an image receiving method that adaptively configure hardware resources.

Description of the Related Art

In the prior art, an image processing system allocates multiple buffers and/or multiple memory channels to multiple image connection interfaces one after another according to a fixed sequence. However, if a buffer and/or a memory allocated to a certain image connection interface do/does not meet standard requirements needed by an image sensor of the certain image connection interface, image data generated by the image sensor may fail to meet expectations. For example, for an image sensor having a high image resolution, a data capacity of a buffer allocated to the image sensor may be incapable of buffering image data generated by the image sensor. For another example, an image sensor may perform image capturing by a special scene mode, and a memory channel allocated to the image sensor however does not support such special scene mode. The situations above result in that an image processing system fails to meet image capturing requirements of the image sensor, leading to compromised versatility of the system.

SUMMARY OF THE INVENTION

In some embodiments, it is an object of the present application to provide an image receiving device that adaptively configures hardware resources thereof and an image receiving method thereof so as to improve the issues of the prior art.

In some embodiments, the image receiving device includes a first-in-first-out (FIFO) memory, a processor circuit and a FIFO multiplexer circuit. The FIFO memory includes a plurality of FIFO buffers. The processor circuit sets a plurality of first pipeline parameters according to device information of a plurality of image sensors and data capacities of the plurality of FIFO buffers. The FIFO multiplexer circuit configures correspondence between the plurality of image sensors and the plurality of FIFO buffers according to the plurality of first pipeline parameters, such that each of the plurality of image sensors transmits image data to a corresponding one of the plurality of FIFO buffers.

In some embodiments, the image receiving device includes the operations of: setting a plurality of first pipeline parameters by a processor according to device information of a plurality of image sensors and data capacities of a plurality of first-in-first-out (FIFO) buffers; and configuring correspondence between the plurality of image sensors and the plurality of FIFO buffers by a FIFO multiplexer circuit according to the plurality of first pipeline parameters, such that each of the plurality of image sensors transmits image data to a corresponding one of the plurality of FIFO buffers.

Features, implementations and effects of the present application are described in detail in preferred embodiments with the accompanying drawings below.

BRIEF DESCRIPTION OF THE DRAWINGS

To better describe the technical solution of the embodiments of the present application, drawings involved in the description of the embodiments are introduced below. It is apparent that, the drawings in the description below represent merely some embodiments of the present application, and other drawings apart from these drawings may also be obtained by a person skilled in the art without involving inventive skills.

DETAILED DESCRIPTION OF THE INVENTION

All terms used in the literature have commonly recognized meanings. Definitions of the terms in commonly used dictionaries and examples discussed in the disclosure of the present application are merely exemplary, and are not to be construed as limitations to the scope or the meanings of the present application. Similarly, the present application is not limited to the embodiments enumerated in the description of the application.

The term “coupled” or “connected” used in the literature refers to two or multiple elements being directly and physically or electrically in contact with each other, or indirectly and physically or electrically in contact with each other, and may also refer to two or more elements operating or acting with each other. As given in the literature, the term “circuit” may be a device connected by at least one transistor and/or at least one active element by a predetermined means so as to process signals.

Figure 1:
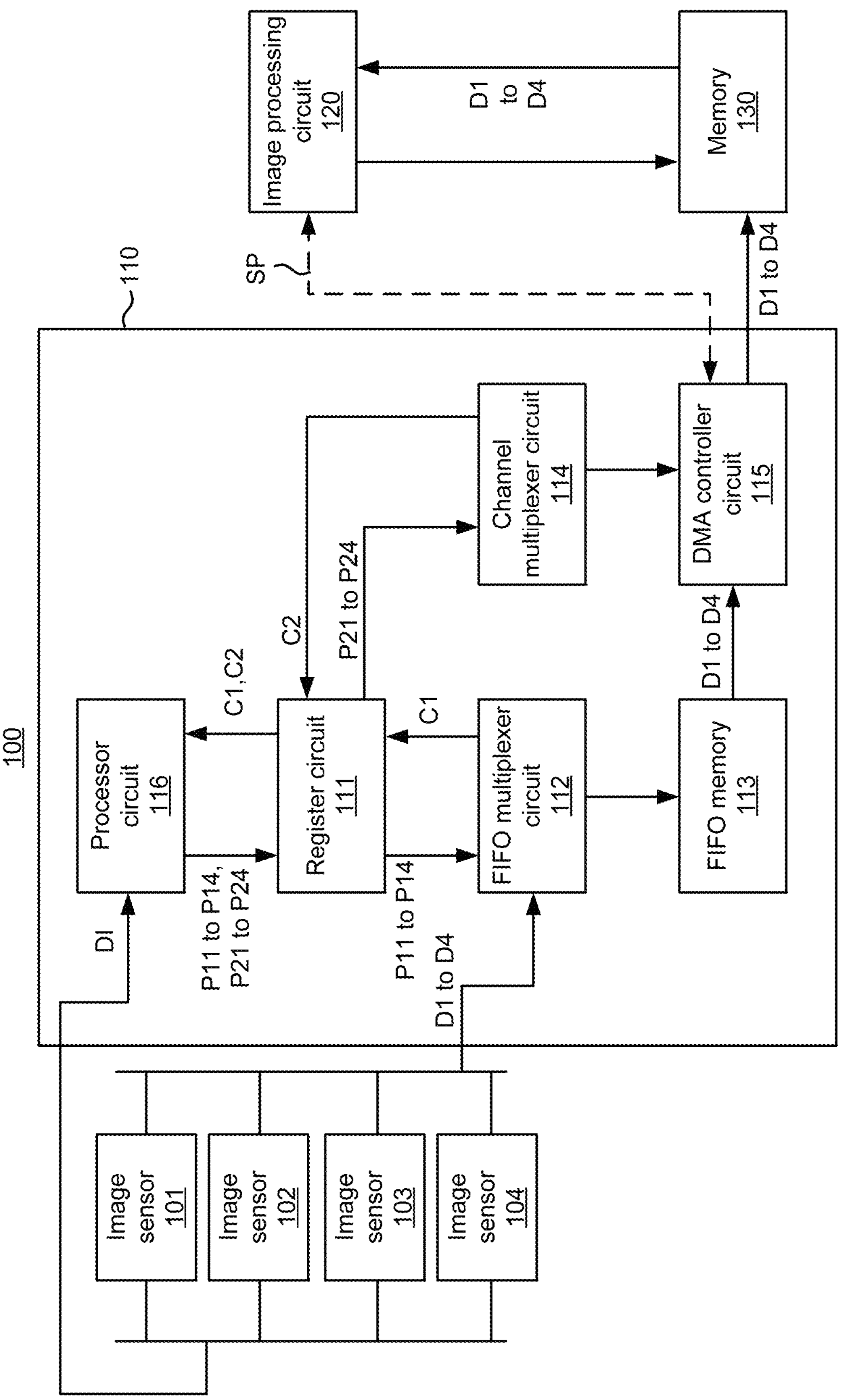
FIG. 1 is a schematic diagram of an image processing system according to some embodiments of the present application.

FIG. 1 shows a schematic diagram of an image processing system 100 according to some embodiments of the present application. The image processing system 100 includes an image receiving device 110, an image processing circuit 120 and a memory 130. In some embodiments, multiple image sensors 101 to 104 are sensing devices capable of converting optical signals to electrical signals (for example, multiple sets of image data D1 to D4). The image receiving device 110 is coupled to the multiple sensors 101 to 104 to receive the image data D1 to D4. More specifically, the image receiving device 110 is capable of adaptively allocating hardware buffers in the image receiving device 110 to the multiple sensors 101 to 104 according to device requirements of the multiple image sensors 101 to 104, so as to more efficiently utilize limited hardware resources. The image receiving device 110 may temporarily store the image data D1 to D4 in a buffer therein, and forward the image data D1 to D4 to the memory 130. Thus, the image processing circuit 120 may obtain the image data D1 to D4 from the memory 130 to perform subsequent image processing (for example, high dynamic range (HDR) image processing to be described below). In some embodiments, the memory 130 may be, for example but not limited to, a dynamic random access memory (DRAM).

In some embodiments, the image receiving device 110 includes a register circuit 111, a first-in-first-out (FIFO) multiplexer circuit 112, a FIFO memory 113, a channel multiplexer circuit 114, a direct memory access (DMA) controller circuit 115 and a processor circuit 116. In some embodiments, after the image processing system 100 is electrically energized, the processor circuit 116 may perform initialization configuration on the multiple sensors 101 to 104 via an inter-integrated circuit ($I^2C$) bus, and obtain device information DI of the multiple image sensors 101 to 104. In some embodiments, the device information DI may indicate such as respective image resolutions and scene modes of the multiple image sensors 101 to 104. The processor circuit 116 may perform multiple operations in FIG. 3 and FIG. 4 below according to the device information DI as well as a parameter C1 and a parameter C2 in the register circuit 111, so as to set multiple pipeline parameters P11 to P14 and multiple pipeline parameters P21 to P24. In some embodiments, the multiple image sensors 101 to 104 may transmit the image data D1 to D4 to the FIFO multiplexer circuit 112 via a mobile industry processor interface (MIPI).

The FIFO memory 113 includes multiple FIFO buffers (for example, multiple FIFO buffers 113A to 113D in FIG. 2), which may be used to temporarily store the image data D1 to D4. In some embodiments, the parameter C1 in the register circuit 111 may be used to indicate data capacities and priorities of the FIFO buffers 113A to 113D, such that the processor circuit 116 may set the multiple pipeline parameters P11 to P14 according to the data capacities, the priorities and the device information DI above. In some embodiments, the FIFO multiplexer circuit 112 may configure correspondence between the multiple image sensors 101 to 104 and the multiple FIFO buffers 113A to 113D according to the multiple pipeline parameters P11 to P14. For example, according to the pipeline parameter P11, the FIFO multiplexer circuit 112 may assign the FIFO buffer 113A to the image sensor 101, such that the image sensor 101 may transmit the image data D1 to the FIFO buffer 113A via the FIFO multiplexer circuit 112. Similarly, the correspondence between the multiple pipeline parameters P12 to P14 and the multiple FIFO buffers 113B to 113D can be understood accordingly. In some embodiments, the FIFO memory 113 may be, for example but not limited to, an asynchronous FIFO memory.

Figure 2:
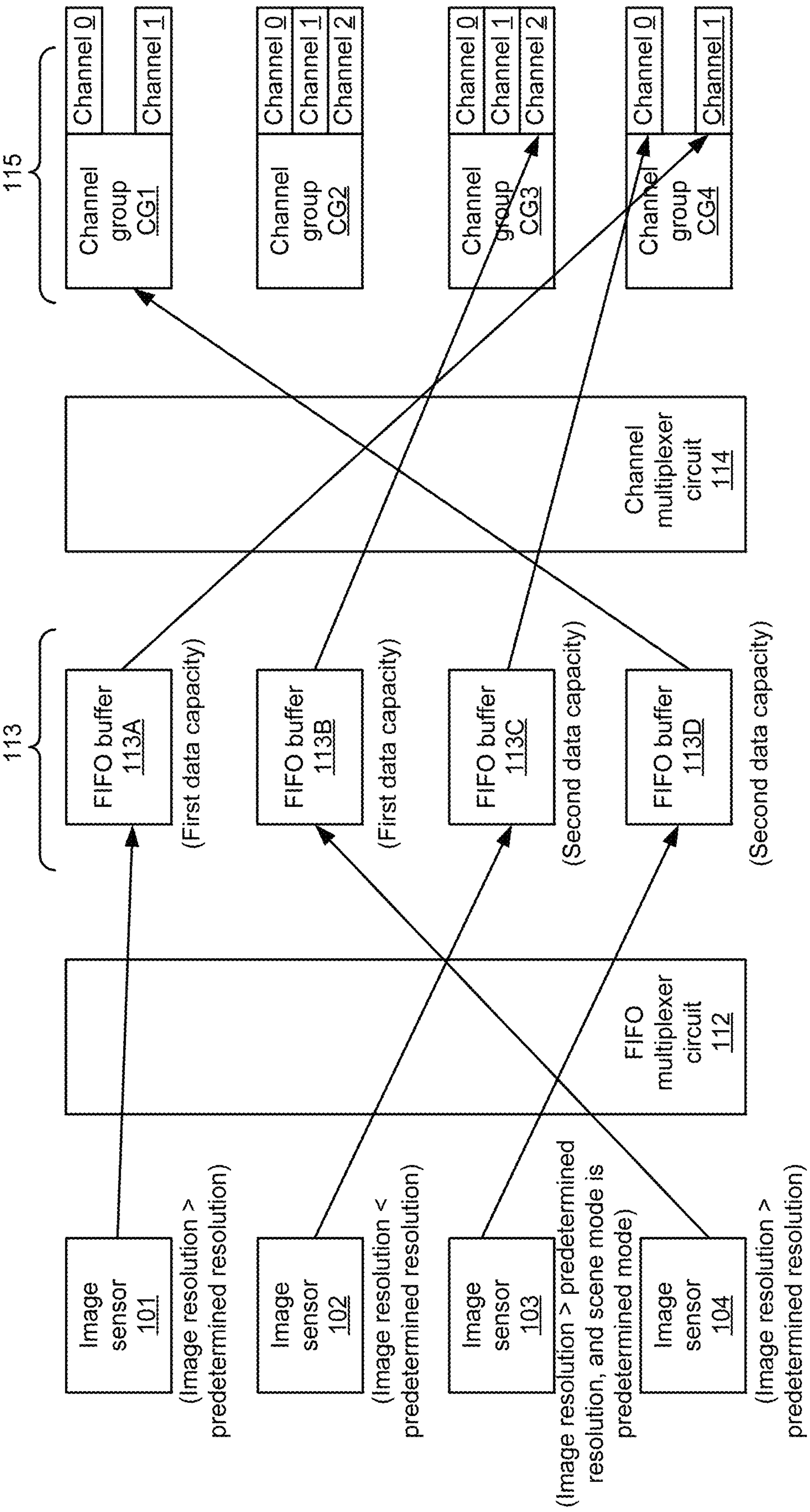
FIG. 2 is a schematic diagram of operations of the first-in-first-out (FIFO) circuits and the channel multiplexer circuit in FIG. 1 according to some embodiments of the present application.

Similarly, the DMA controller circuit 115 includes multiple channel groups (for example, multiple channel groups CG1 to CG4 in FIG. 2), and each of the channel groups includes multiple access channels (for example, channels 0 to 2 in FIG. 2). In some embodiments, the parameter C2 in the register circuit 111 may be used to indicate priorities of the multiple channel groups and priorities of the multiple access channels of each of the channel groups, such that the processor circuit 116 may set the multiple pipeline parameters P21 to P24 according to the priorities of the two above and the device information DI. The channel multiplexer circuit 114 may configure correspondence between the multiple FIFO buffers 113A to 113D and the multiple access channels according to the multiple pipeline parameters P21 to P24. For example, according to the pipeline parameter P21, the channel multiplexer circuit 114 may assign the channel 0 and the channel 1 in the channel group CG1 to the FIFO buffer 113D, such that the FIFO buffer 113D may transmit the image data D4 to the memory 130 and/or the image processing circuit 120 via the channel 0 and the channel 1 in the channel group CG1. Similarly, the correspondence between the multiple pipeline parameters P22 to P24 and the multiple channel groups CG2 to CG4 can be understood accordingly. In some embodiments, each of the FIFO multiplexer circuit 112 and the channel multiplexer circuit 114 may connect to corresponding sensors and corresponding access channels by means of establishing virtual channels; however, the present application is not limited to the example above.

FIG. 2 shows a schematic diagram of operations of the FIFO circuit 112 and the channel multiplexer circuit 114 in FIG. 1 according to some embodiments of the present application. As described above, the FIFO memory 113 includes the multiple FIFO buffers 113A to 113D, and the DMA controller circuit 115 includes the multiple channels groups CG1 to CG4 each including multiple channels (that is, the channels 0 to 2 in the drawings). With the FIFO multiplexer circuit 112, each of the multiple FIFO buffers 113A to 113D is allocated to a corresponding one of the multiple image sensors 101 to 104, so as to receive a corresponding set of data in the image data D1 to D4. Similarly, with the channel multiplexer circuit 114, each of the multiple channel groups CG1 to CG4 is allocated to a corresponding one of the multiple FIFO buffers 113A to 113D, so as to transmit the corresponding set of data in the image data D1 to D4 to the memory 130 and/or the image processing circuit 120. Related operation details of FIG. 2 are to be described with reference to FIG. 3 and FIG. 4 below.

Figure 3:
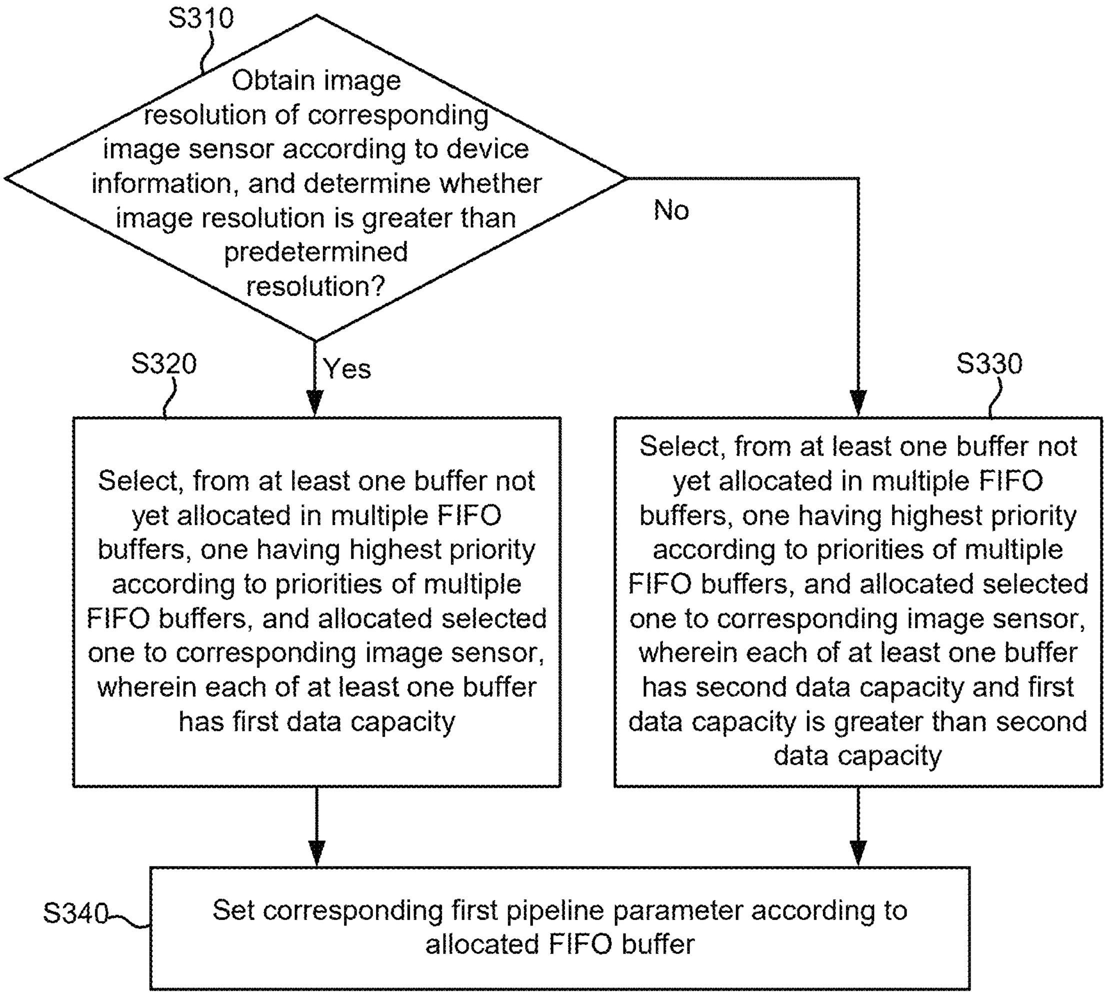
FIG. 3 is a flowchart of operations of the processor circuit and the FIFO multiplexer circuit in FIG. 1 allocating FIFO buffers according to some embodiments of the present application.

FIG. 3 shows a flowchart of operations of the processor circuit 116 and the FIFO multiplexer circuit 112 in FIG. 1 allocating FIFO buffers according to some embodiments of the present application. In some embodiments, the processor circuit 116 may set the multiple pipeline parameters P11 to P14 by performing multiple processes in FIG. 3, such that the FIFO multiplexer circuit 112 may configure correspondence between the multiple image sensors 101 to 104 and the multiple FIFO buffers 113A to 113D according to the multiple pipeline parameters P11 to P14.

In operation S310, an image resolution of a corresponding image sensor is obtained according to device information, and it is determine whether the image resolution is greater than a predetermined resolution. If so, operation S320 is performed; if not, operation S330 is performed. In operation S320, from at least one buffer that is not yet allocated in the multiple FIFO buffers, one having a highest priority is selected according to priorities of the multiple FIFO buffers, and the selected one is allocated to the corresponding image sensor, wherein each of the at least one buffer has a first data capacity. In operation S330, from at least one buffer not yet allocated in the multiple FIFO buffers, one having a highest priority is selected according to the priorities of the multiple FIFO buffers, and the selected one is allocated to the corresponding image sensor, wherein each of the at least one buffer has a second data capacity and the first capacity is greater than the second data capacity. In operation S340, a first corresponding pipeline parameter is set according to the FIFO buffer allocated.

For example, the processor circuit 116 may determine according to the device information DI of the image sensor 101 whether an image resolution of the image sensor 101 is greater than a predetermined resolution (for example but not limited to, 5 M, that is, 2560×1920). In this case, the processor circuit 116 may select a buffer having the first data capacity (at least sufficient for temporarily storing image data greater than or equal to the predetermined resolution) from the multiple FIFO buffers 113A to 113D according to the parameter C1, and allocate this buffer to the image sensor 101. For example, assume that none of the multiple FIFO buffers 113A to 113D has been allocated, the data capacity of each of the multiple FIFO buffers 113A and 113B is 4K bytes (which may be the first data capacity above; however, the present application is not limited to the example above), and the data capacity of each of the multiple FIFO buffers 113C and 113D may be 2K bytes (which may be the second data capacity above; however, the present application is not limited to the example above). Since the image resolution of the image sensor 101 is greater than the predetermined resolution, the processor circuit 116 selects the buffers 113A and 113B having the first data capacity which is larger from the multiple FIFO buffers 113A to 113D according to the parameter C1, and selects the FIFO buffer 113A having a higher priority from the two buffers according to their priorities. Thus, the processor circuit 116 may set the pipeline parameter P11 according to the allocation result above, such that the FIFO multiplexer circuit 112 may allocate the FIFO buffer 113A to the image sensor 101 according to the pipeline parameter P11.

In some embodiments, the parameter C1 may be further used to indicate the priorities of the multiple FIFO buffers 113A to 113D. For example, each of the multiple FIFO buffers 113A to 113D may be configured with a sequence number. The priority gets lower as the value of the sequence number increases. In one example, the sequence numbers of the multiple FIFO buffers 113A to 113D may be represented as the table below:

| FIFO buffer | Sequence number |
|---|---|
| 113A | 0 |
| 113B | 1 |
| 113C | 2 |
| 113D | 3 |

Thus, in the example above, the FIFO buffers having the first data capacity include the FIFO buffer 113A and the FIFO buffer 113B, and the FIFO buffer 113A has a higher priority, and therefore the processor circuit 116 preferentially allocates the FIFO buffer 113A to the image sensor 101.

Similarly, the processor circuit 116 may determine according to the device information DI of the image sensor 102 that the resolution of the image sensor 102 is not greater than the predetermined resolution. In this case, the processor circuit 116 may select a buffer having the second data capacity from the multiple FIFO buffers 113A to 113D according to the parameter C1, and allocate this buffer to the image sensor 102. For example, since the image resolution of the image sensor 102 is not greater than the predetermined resolution, the processor circuit 116 selects the buffers 113C and 113D having the first data capacity which is smaller from the multiple FIFO buffers 113A to 113D according to the parameter C1, and selects the FIFO buffer 113C having a higher priority from the two buffers according to their priorities. Thus, the processor circuit 116 may set the pipeline parameter P13 according to the allocation result above, such that the FIFO multiplexer circuit 112 may allocate the FIFO buffer 113C to the image sensor 102 according to the pipeline parameter P13. Similarly, the FIFO multiplexer circuit 112 may complete setting of all of the pipeline parameters P11 to P14, such that the FIFO multiplexer circuit 112 may configure correspondence between the multiple image sensors 101 to 104 and the multiple FIFO buffers 113A to 113D according to the multiple pipeline parameters P11 to P14.

Figure 4:
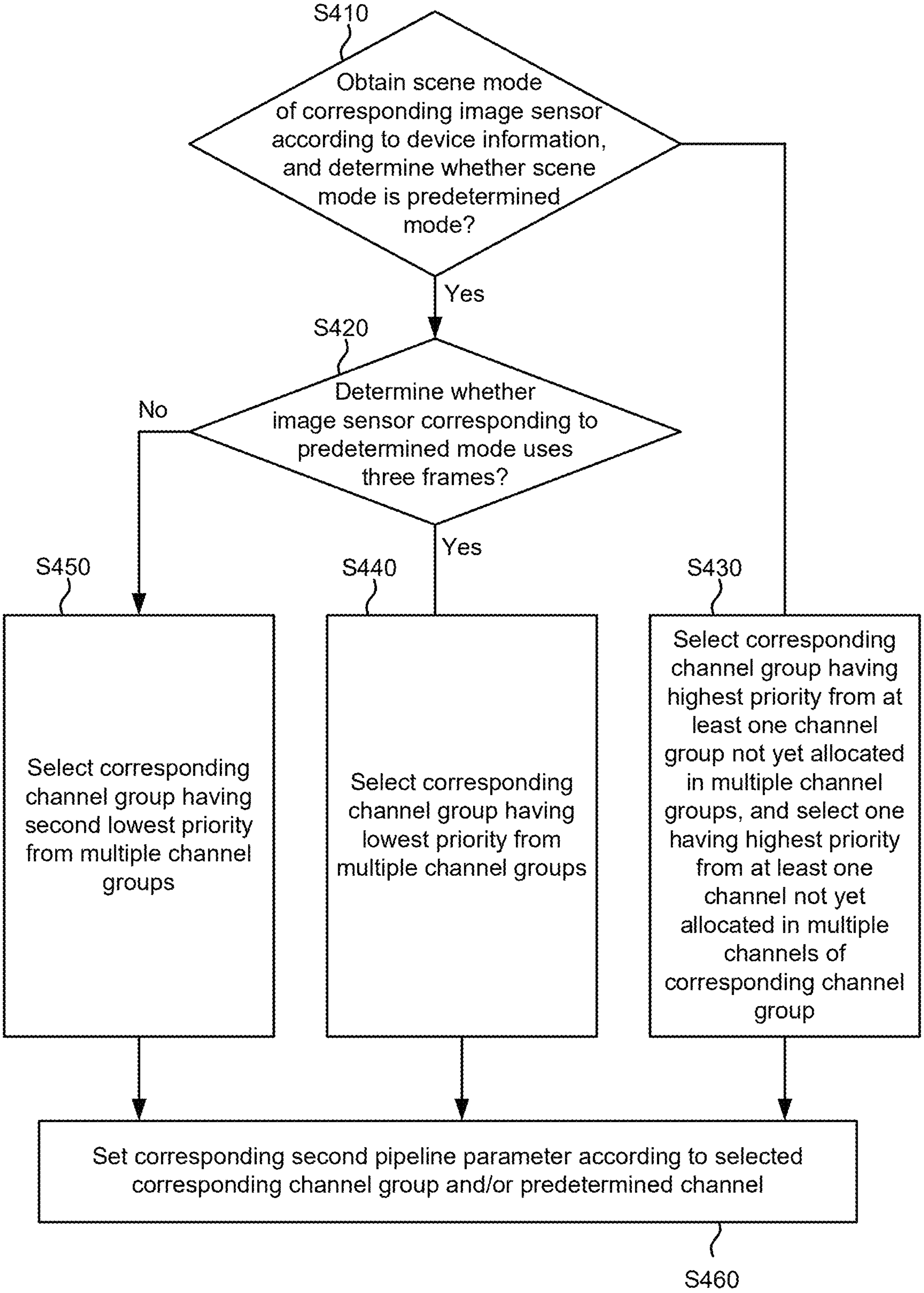
FIG. 4 is a flowchart of operations of the processor circuit and the FIFO multiplexer circuit in FIG. 1 allocating channel groups according to some embodiments of the present application.

FIG. 4 shows a flowchart of operations of the processor circuit 116 and the FIFO multiplexer circuit 114 in FIG. 1 allocating channel groups according to some embodiments of the present application. In some embodiments, the processor circuit 116 may set the multiple pipeline parameters P21 to P24 by performing multiple processes in FIG. 4, such that the FIFO multiplexer circuit 114 may configure correspondence between multiple access channels in multiple channel groups CG1 to CG4 and the multiple FIFO buffers 113A to 113D according to the multiple pipeline parameters P21 to P24.

In operation S410, a scene mode of a corresponding image sensor is obtained according to device information, and it is determined whether the scene mode is a predetermined mode. If so, operation S420 is performed; if not, operation S430 is performed. In operation S420, it is determined whether image processing corresponding to the predetermined scene uses three frames. If so, operation S440 is performed; if not, operation S450 is performed. In operation S430, from at least one group not yet allocated in the multiple channel groups, a corresponding channel group having a highest priority is selected, and from at least one channel not yet allocated in multiple access channels of the corresponding channel group, one having a highest priority is selected as a predetermined channel. In operation S440, a corresponding channel group having a lowest priority is selected from the multiple channel groups. In operation S450, a corresponding channel group having a second lowest priority is selected from the multiple channel groups. In operation S460, a second corresponding pipeline parameter is set according to the corresponding channel group and/or predetermined channel selected.

In some embodiments, the predetermined mode is a real-time high dynamic range (HDR) mode; however, the present invention is not limited to the example above. For example, the processor circuit 116 may determine according to the device information DI of the image sensor 101 that the scene mode of the image sensor 101 is not the real-time HDR mode. In this case, according to the parameter C2, the processor circuit 116 may select a channel group having a highest priority from at least one channel group not yet allocated in the multiple channel groups CG1 to CG4, select a channel having a highest priority from at least one channel not yet allocated in the channel group, and set the channel having the highest priority as the predetermined channel. For example, assume that none of the multiple channel groups CG1 to CG4 has not been allocated. Since the scene mode of the image sensor 101 is not the real-time HDR mode, the processor circuit 116 may select, according to the parameter C2, the channel group CG4 having the highest priority from the multiple channel groups CG1 to CG4, and select the channel 1 having the highest priority from the channel 0 and the channel 1 not yet allocated in the channel group CG4, as the predetermined channel (that is, operation S430). Thus, the processor circuit 116 may set the pipeline parameter P24 according to the configuration result above (that is, operation S460), such that the channel multiplexer circuit 114 may allocate the channel 1 in the channel group CG4 to the FIFO buffer 113A (which is allocated to the image sensor 101) according to the pipeline parameter P24.

In some embodiments, the parameter C2 may be further used to indicate the priorities of the multiple channel groups CG1 to CG4 and the priorities of the multiple channels 0 to 2 in the multiple channel groups CG1 to CG4. For example, each of the multiple channel groups CG1 to CG4 may be configured with a first sequence number. The priority of a corresponding channel group gets lower as the value of the first sequence number increases. Similarly, each of the multiple channels 0 to 2 may be configured with a second sequence number. The priority of a corresponding access channel gets lower as the value of the second sequence number increases. In one example, the multiple first sequence numbers and the multiple second sequence numbers may be represented as the table below:

| Channel group | First sequence number | Channel | Second sequence number |
|---|---|---|---|
| CG1 | 2 | 0 | 14 |
| | | 1 | 13 |
| CG2 | 3 | 0 | 16 |
| | | 1 | 15 |
| | | 2 | 15 |
| CG3 | 1 | 0 | 12 |
| | | 1 | 11 |
| | | 2 | 10 |
| CG4 | 0 | 0 | 1 |
| | | 1 | 0 |

In some embodiments, the priority of a channel group to which a channel belongs gets higher (that is, as the first sequence number decreases) as the priority of the channel is higher (that is, as the second sequence number decreases). In the example above, the processor circuit 116 selects the channel group CG4 having the highest priority from the multiple channel groups CG1 to CG4, selects the channel 1 having the highest priority in the channel group CG4, and allocates, by the channel multiplexer circuit 114, the channel 1 to the FIFO buffer 113A previously assigned to the image sensor 101. In some embodiments, after the image processing system 100 is electrically energized, the processor circuit 116 may perform initialization configuration on the FIFO memory 113 and the DMA controller 115 during initialization of the multiple image sensors 101 to 104, to obtain information (for example, data capacities and priorities) of individual FIFO buffers via the FIFO multiplexer circuit 112 so as to set the parameter C1, and obtain information (for example, priorities of channel groups and priorities of access channels therein) of individual channel groups and access channels thereof so as to set the parameter C2.

In some embodiments, image processing corresponding to the real-time HDR mode usually involves multiple images (for example, including an image frame exposed under a short period of time and an image frame exposed under a long period of time), and the DMA controller circuit 115 may use a pre-configured access channel to directly transmit the images above to the image processing circuit 120 (as shown by the path SP in FIG. 1)) without passing through the memory 130. Thus, in some embodiments, the priorities of the multiple channel groups CG1 to CG4 may be set according to the first sequence number, and the priorities of the multiple channel groups CG1 and CG2 that support the real-time HDR mode are set as last two priorities (that is, the lowest or the second lowest priority above), so as to pre-preserve these two channel groups CG1 and CG2. Further, the numbers of channels in the multiple channel groups CG1 and CG2 are also correspondingly set according to the number of frames involved in image processing corresponding to the real-time HDR mode. For example, if the number of frames involved in the image processing corresponding to the real-time HDR mode is 2, the channel group CG1 having two channels may be allocated to a corresponding sensor operated in the real-time HDR mode. Alternatively, if the number of frames involved in the image processing corresponding to the real-time HDR mode is 3, the channel group CG2 having three channels may be allocated to a corresponding sensor operated in the real-time HDR mode. In this embodiment, the channel group CG1 having two channels is set to have the second lowest priority, and the channel group CG2 having three channels is set to have the lowest priority; however, the present application is not limited to the examples above. In a different embodiment, the channel group CG1 having two channels may be set to have the lowest priority, and the channel group CG2 having three channels may be set to have the second lowest priority. In some embodiments, the processor circuit 116 may determine according to the device information DI whether a scene mode is the real-time HDR mode and may further determine according to the device information DI whether the real-time HDR mode is an HDR mode using three frames.

For example, the processor circuit 116 determines according to the device information DI of the image sensor 101 that the scene mode of the image sensor 101 is the real-time HDR mode, and determines that the image processing corresponding to the real-time HDR mode does not use three frames. In this case, from at least one channel group not yet allocated in the multiple channel groups CG1 to CG4, the processor circuit 116 may select the channel group CG1 having the second lowest priority according to the parameter C2 (that is, operation S450), and accordingly set the pipeline parameter P21 (that is, operation S460). Thus, as shown in FIG. 2, the channel multiplexer circuit 114 may allocate the channel 0 and the channel 1 of the channel group CG1 having the second lowest priority to the FIFO buffer 113A according to the pipeline parameter P21, so as to respectively transmit multiple frames.

Similarly, assume that the processor circuit 116 determines according to the device information DI of the image sensor 101 that the scene mode of the image sensor 101 is the real-time HDR mode, and determines that the image processing corresponding to the real-time HDR mode uses three frames. In this case, from at least one channel group not yet allocated in the multiple channel groups CG1 to CG4, the processor circuit 116 may select the channel group CG2 having the lowest priority according to the parameter C2 (that is, operation S440), and accordingly set the pipeline parameter P22 (that is, operation S460). Thus, the channel multiplexer circuit 114 may allocate the channel 0 to the channel 2 of the channel group CG2 having the lowest priority to the FIFO buffer 113A according to the pipeline parameter P22, so as to respectively transmit multiple frames.

Similarly, related operations for allocating the multiple FIFO buffers 113A to 113D and the multiple channel groups CG1 to CG4 can be understood accordingly. More specifically, taking the embodiment in FIG. 2 for example, the image resolution of the image sensor 101 is greater than the predetermined resolution, and so the processor circuit 116 may select the FIFO buffer 113A having the highest priority from the multiple FIFO buffers 113A and 113B having the first data capacity from the multiple FIFO buffers 113A to 113D, and allocate the FIFO buffer 113A to the image sensor 101 by the FIFO multiplexer circuit 112. Next, since the scene mode of the image sensor 101 is not a predetermined mode (for example, the real-time HDR mode), the processor circuit 116 may select the channel group CG4 having the highest priority in the multiple channel groups CG1 to CG4, and allocate the channel 1 having the highest priority in the channel group CG1 to the FIFO buffer 113A by the channel multiplexer circuit 114.

The image resolution of the image sensor 102 is smaller than the predetermined resolution, and so the processor circuit 116 may select the FIFO buffer 113C having the highest priority from the multiple FIFO buffers 113C and 113D having the second data capacity in the multiple FIFO buffers 113A to 113D, and allocate the FIFO buffer 113C to the image sensor 102 by the FIFO multiplexer circuit 112. Next, since the scene mode of the image sensor 102 is not the predetermined mode, the processor circuit 116 may select the channel group CG4 having the highest priority in the multiple channel groups CG1 to CG4, and allocate the channel 0 having the second highest priority (the channel 1 having the highest priority has been allocated) in the channel group CG4 to the FIFO buffer 113C by the channel multiplexer circuit 114.

The image resolution of the image sensor 103 is smaller than the predetermined resolution, and so the processor circuit 116 may select the FIFO buffer 113D not yet allocated from the multiple FIFO buffers 113D and 113D having the second data capacity in the multiple FIFO buffers 113A to 113D, and allocate the FIFO buffer 113D to the image sensor 103 by the FIFO multiplexer circuit 112. Next, since the scene mode of the image sensor 103 is the predetermined mode and the image processing thereof does not use three images, the processor circuit 116 may select the channel group CG1 having the second lowest priority in the multiple channel groups CG1 to CG4, and allocate the multiple channels 0 and 1 in the channel group CG1 to the FIFO buffer 113D by the channel multiplexer circuit 114.

The image resolution of the image sensor 104 is greater than the predetermined resolution, and so the processor circuit 116 may select the FIFO buffer 113A not yet allocated from the multiple FIFO buffers 113A and 113B having the first data capacity in the multiple FIFO buffers 113A to 113D, and allocate the FIFO buffer 113A to the image sensor 104 by the FIFO multiplexer circuit 112. Next, since the scene mode of the image sensor 104 is not the predetermined mode, the processor circuit 116 may select the channel group CG3 (because all channels in the channel group CG4 having the highest priority have been allocated) from the remaining multiple channel groups CG2 and CG3, and allocate the channel 2 having the highest priority in the channel group CG3 to the FIFO buffer 113B by the channel multiplexer circuit 114.

In some other embodiments, if the scene mode of the image sensor 104 is the predetermined mode and the image processing thereof uses three images, the processor circuit 116 may select the channel group CG2 having the lowest priority in the multiple channel groups CG1 to CG4, and allocate the multiple channels 0 to 2 in the channel group CG2 to the FIFO buffer 113B by the channel multiplexer circuit 114.

In some embodiments, the multiple operations in FIG. 3 and FIG. 4 may be implemented by software or a driver, and the processor circuit 116 may perform the multiple operations in FIG. 3 and FIG. 4 by executing an instruction set of the software or the driver. On the other hand, configurations related to the predetermined mode, the number of sensors, the number of channels and the predetermined resolution are merely examples, and the present application is not limited thereto.

In some related art, a processor circuit allocates FIFO buffers and channels of a DMA controller to corresponding image sensors one after another. For example, the first FIFO buffer is permanently assigned to the first image sensor, and the first channel (or the first channel group) of the DMA controller is permanently assigned to the first FIFO buffer. It is possible that the permanent assigning means above leads to a case that some image sensors use buffers with insufficient specifications (for example, a high-resolution image sensor is assigned with a low-data capacity buffer, or an image sensor using the HDR mode is assigned with a DMA channel that does not support the HDR mode), resulting in failures in meeting image capturing scenes. Compared to the techniques above, in some embodiments of the present application, with the multiple operations in FIG. 3 and FIG. 4, the processor circuit 116 is capable of adaptively configuring correspondence between the multiple FIFO buffers 113A to 113D and the multiple image sensors 101 to 104 according to the device information DI, the data capacities (indicated by the parameter C1) of the multiple FIFO buffers 113A to 113D, and the priorities of the multiple channel groups CG1 to CG4 and the priorities (indicated by the parameter C2) of the multiple channels 0 to 2, thereby satisfying application requirements of difference scenes and enhancing system resource utilization.

Figure 5:
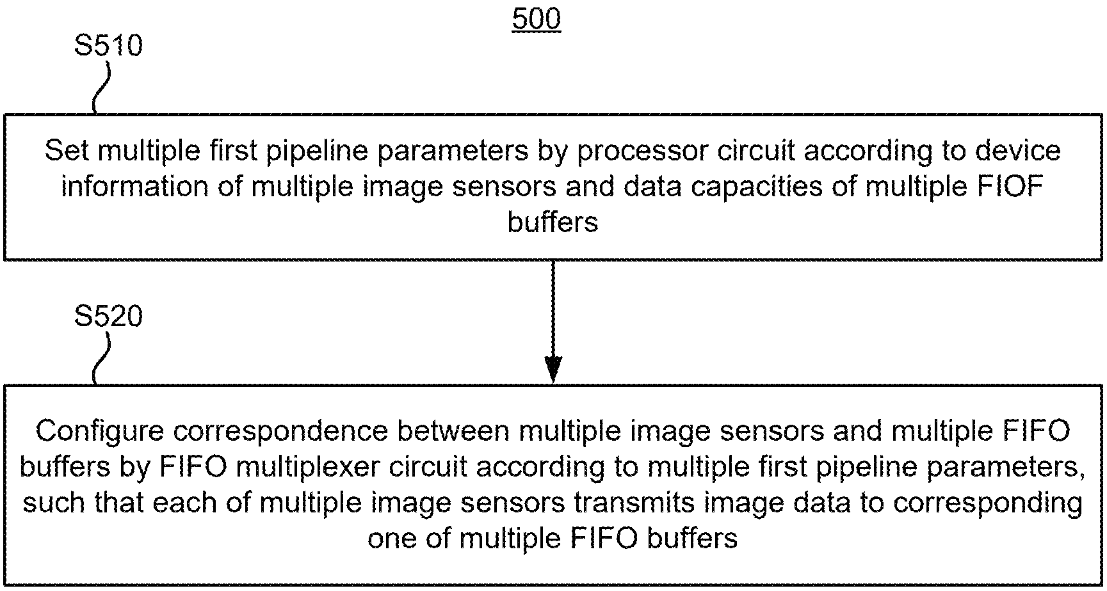
FIG. 5 is a flowchart of an image receiving method according to some embodiments of the present application.

FIG. 5 shows a flowchart of an image receiving method 500 according to some embodiments of the present application. In operation S510, a plurality of first pipeline parameters are set by a processor circuit according to device information of a plurality of image sensors and data capacities of a plurality of FIFO buffers. In operation S520, correspondence between the plurality of image sensors and the plurality of FIFO buffers is set by a FIFO multiplexer circuit according to the plurality of first pipeline parameters, such that each of the plurality of image sensors transmits image data to a corresponding one of the plurality of FIFO buffers.

Details associated with the multiple operations of the image receiving method 500 above can be referred from the details of the embodiments above, and are omitted herein. The plurality operations of the image receiving method 500 above are merely examples, and are not limited to being performed in the order specified in this example. Without departing from the operation means and ranges of the various embodiments of the present application, additions, replacements, substitutions or omissions may be made to the operations of the image receiving method 500, or the operations may be performed in different orders. Alternatively, all or some of the operations in the image receiving method 500 may be performed simultaneously.

In conclusion, the image receiving device and the image receiving method provided according to some embodiments of the present application are capable of adaptively configuring correspondence between multiple image sensors and multiple FIFO buffers by using device information of the image sensors, thereby enhancing the overall resource utilization so as to be suitable for more diversified scene requirements.

While the present application has been described by way of example and in terms of the preferred embodiments, it is to be understood that the disclosure is not limited thereto. Various modifications made be made to the technical features of the present application by a person skilled in the art on the basis of the explicit or implicit disclosures of the present application. The scope of the appended claims of the present application therefore should be accorded with the broadest interpretation so as to encompass all such modifications.

What is claimed is:

1. An image receiving device, comprising:

a first-in-first-out (FIFO) memory, comprising a plurality of FIFO buffers;

a processor circuit, setting a plurality of first pipeline parameters according to device information of a plurality of image sensors and data capacities of the plurality of FIFO buffers;

a FIFO multiplexer circuit, configuring correspondence between the plurality of image sensors and the plurality of FIFO buffers according to the plurality of first pipeline parameters, such that each of the plurality of image sensors transmits image data to a corresponding one of the plurality of FIFO buffers.

2. The image receiving device according to claim 1, wherein the device information comprises an image resolution of a corresponding image sensor in the plurality of image sensors, and if the image resolution is greater than a predetermined resolution, the FIFO multiplexer circuit assigns a first buffer having a first data capacity in the plurality of FIFO buffers to the corresponding image sensor according to a corresponding parameter in the plurality of first pipeline parameters.

3. The image receiving device according to claim 2, wherein the processor circuit further sets the plurality of first pipeline parameters according to priorities of the plurality of FIFO buffers, and if a plurality of second buffers not yet allocated in the plurality of FIFO buffers have the first data capacity, the FIFO multiplexer circuit configures one having a highest priority in the plurality of second buffers as the first buffer.

4. The image receiving device according to claim 2, wherein if the image resolution is less than the predetermined resolution, the FIFO multiplexer circuit assigns a second buffer having a second data capacity in the plurality of FIFO buffers to the corresponding image sensor, and the first data capacity is greater than the second data capacity.

5. The image receiving device according to claim 4, wherein the processor circuit further sets the plurality of first pipeline parameters according to priorities of the plurality of FIFO buffers, and if a plurality of third buffers not yet allocated in the plurality of FIFO buffers have the second data capacity, the FIFO multiplexer circuit configures one having a highest priority in the plurality of third buffers as the second buffer.

6. The image receiving device according to claim 1, further comprising:

a direct memory access (DMA) controller circuit, comprising a plurality of channel groups, wherein each of the channel groups comprises a plurality of access channels;

the processor circuit further setting a plurality of second pipeline parameters according to device information of a plurality of image sensors; and a channel multiplexer circuit, configuring correspondence between the plurality of access channels and the plurality of FIFO buffers according to the plurality of second pipeline parameters, such that each of the plurality of FIFO buffers transmits the image data to a memory via a corresponding channel in the plurality of access channels.

7. The image receiving device according to claim 6, wherein the device information comprises a scene mode of the corresponding image sensor, and the processor circuit determines whether the scene mode is a predetermined mode so as to set a corresponding parameter in the plurality of second pipeline parameters.

8. The image receiving device according to claim 7, wherein the processor circuit further sets the plurality of second pipeline parameters according to priorities of the plurality of channel groups and priorities of the plurality of access channels, and if the scene mode is not the predetermined mode, the processor circuit selects a corresponding channel group having a highest priority from at least one channel group not yet allocated in the plurality of channel groups, selects one having a highest priority from at least one channel not yet allocated in the plurality of access channels of the corresponding channel group as a predetermined channel, and allocates, by the channel multiplexer circuit, the predetermined channel to one of the plurality of FIFO buffers that is allocated to the corresponding image sensor.

9. The image receiving device according to claim 8, wherein if the scene mode is the predetermined mode, the processor circuit further determines whether image processing corresponding to the predetermined mode uses three frames so as to set the plurality of second pipeline parameters.

10. The image receiving device according to claim 9, wherein the processor circuit further sets the plurality of second pipeline parameters according to priorities of the plurality of channel groups, and if the image processing uses three frames, the processor circuit selects a corresponding channel group having a lowest priority from the plurality of channel groups, and allocates, by the channel multiplexer circuit, the plurality of channels in the corresponding channel group to one of the plurality of FIFO buffers that is allocated to the corresponding image sensor.

11. The image receiving device according to claim 9, wherein the processor circuit further sets the plurality of second pipeline parameters according to priorities of the plurality of channel groups, and if the image processing uses two frames, the processor circuit selects a corresponding channel group having a second lowest priority from the plurality of channel groups, and allocates, by the channel multiplexer circuit, the plurality of channels in the corresponding channel group to one of the plurality of FIFO buffers that is allocated to the corresponding image sensor.

12. The image receiving device of claim 7, wherein the predetermined mode is a real-time high dynamic range (HDR) mode.

13. An image receiving method, comprising:

setting, by a processor, a plurality of first pipeline parameters according to device information of a plurality of image sensors and data capacities of a plurality of first-in-first-out (FIFO) buffers;

configuring, by a FIFO multiplexer circuit, correspondence between the plurality of image sensors and the plurality of FIFO buffers according to the plurality of first pipeline parameters, such that each of the plurality of image sensors transmits image data to a corresponding one of the plurality of FIFO buffers.

* * * * *